Dec. 20, 1966  V. P. FARLEY  3,292,838
ROTATING SONIC WELDER
Filed Oct. 10, 1960  6 Sheets-Sheet 1

INVENTOR.
VINCENT P. FARLEY
BY
Cyrus D. Samuelson
ATTORNEY

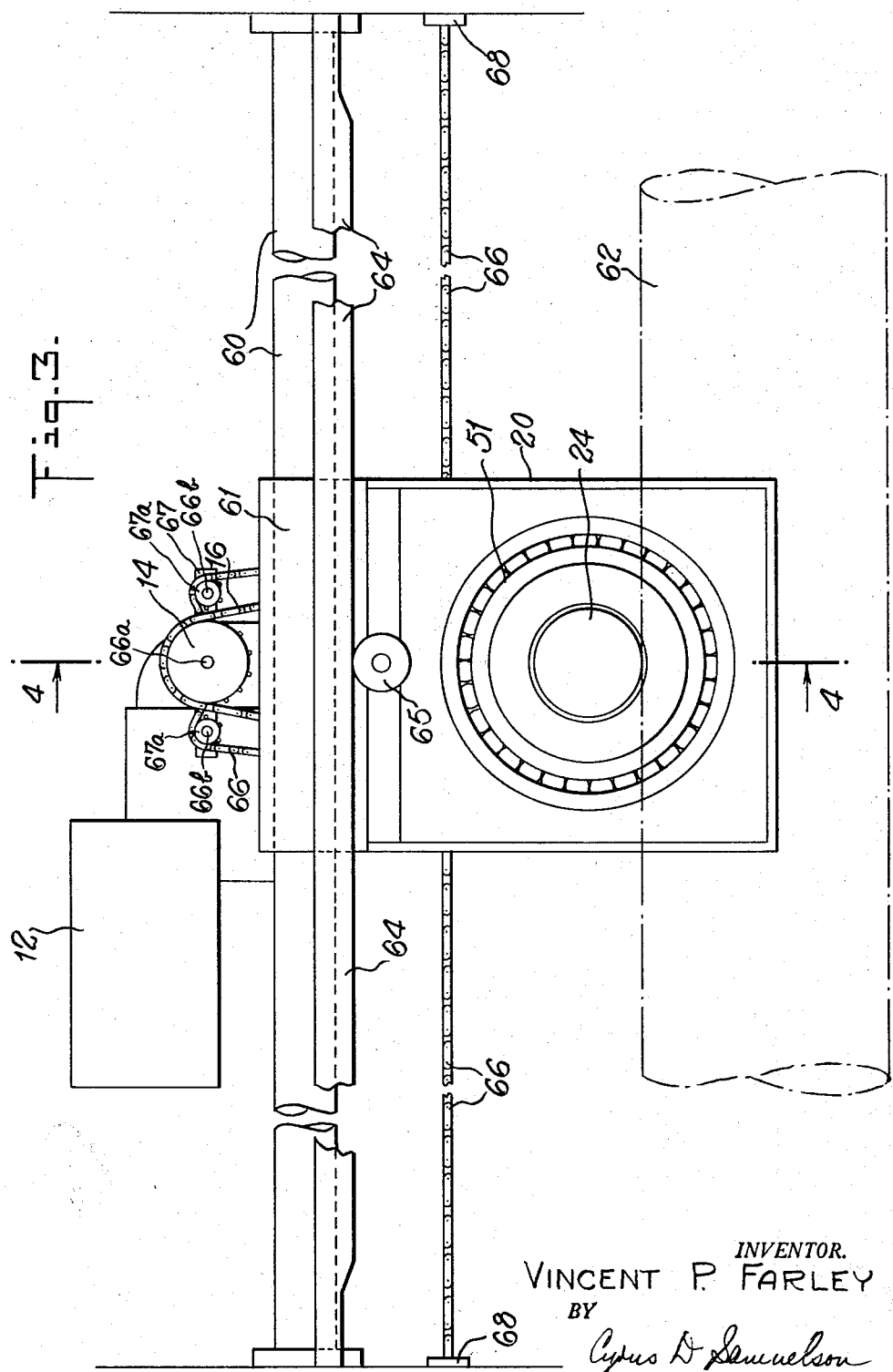

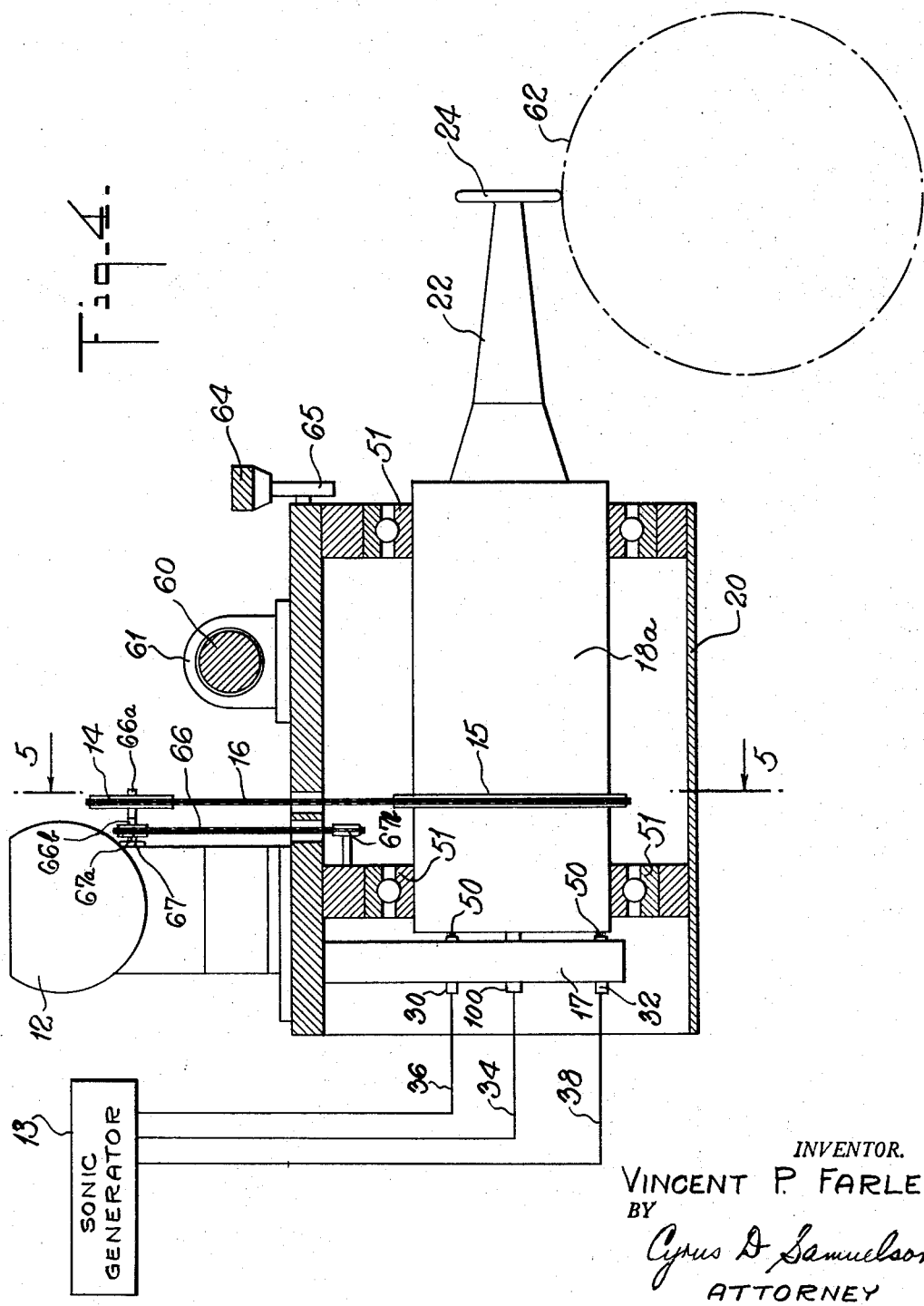

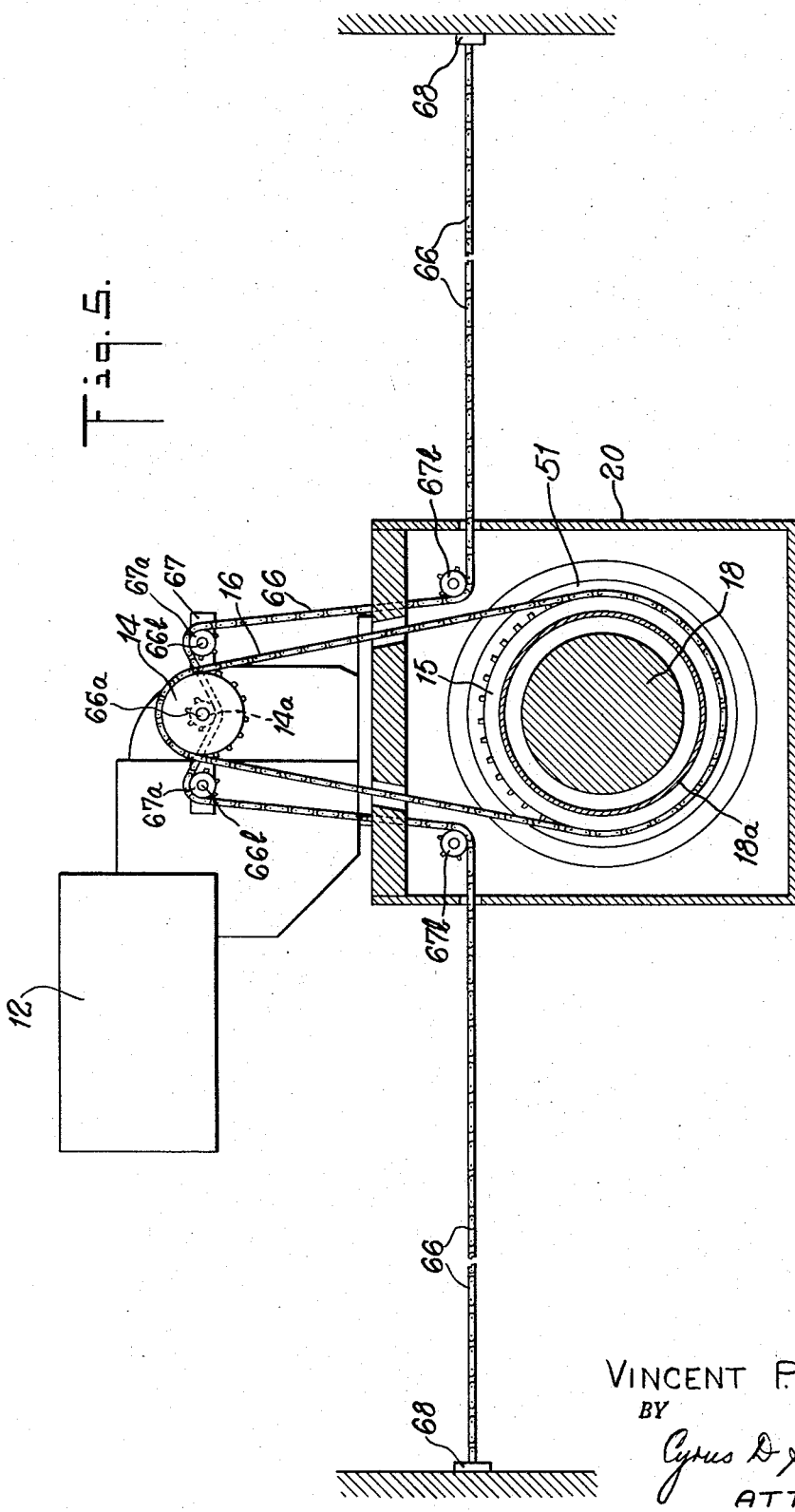

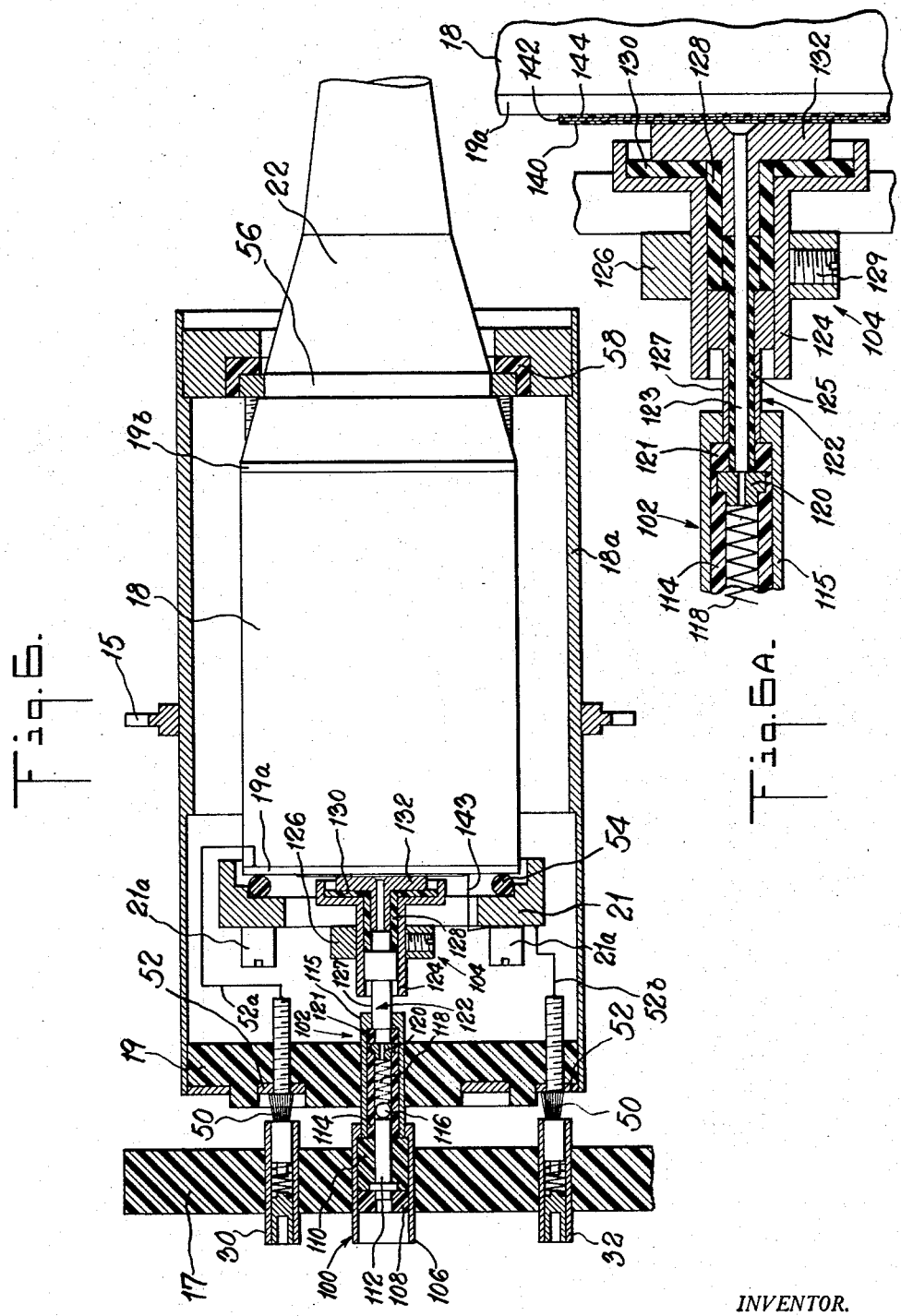

United States Patent Office 3,292,838
Patented Dec. 20, 1966

3,292,838
ROTATING SONIC WELDER
Vincent P. Farley, Nixon, N.J., assignor to Gulton Industries, Inc., Metuchen, N.J., a corporation of New Jersey
Filed Oct. 10, 1960, Ser. No. 61,497
1 Claim. (Cl. 228—1)

My invention relates to sonic welders and in particular to such welders which are provided with a disk-shaped tool tip and wherein the tool tip rotates with respect to the work.

The prior art sonic welders have not been satisfactory for continuous seam welding due to the fact that they do not maintain uniform pressure and contact with respect to the work being welded. The chances of human error in the welding operation are great where hand-held welders are used for the production of continuous seam welds. Chances for error in the welding operation also exist where the welding unit is in a fixed position and the work is dragged or otherwise moved with respect to the tool tip. One of the reasons for the uneven welds in continuous seams produced by the prior art methods and devices resides in the fact that the tool tip wears unevenly and does not make uniformly smooth contact all the way along the seam.

Accordingly, it is an important object of my invention to provide a sonic welder with which continuous seam welds may be made smoothly and uniformly.

It is a further object of my invention to provide such a welder, the whole assembly of which may be rotated so as to rotate the tool tip along the work seam.

These and other objects, advantages, uses and features will be apparent during the course of the following description when taken in conjunction with the accompanying drawings wherein:

FIGURE 3 is a view similar to FIGURE 1 of a further embodiment of sonic welder of my invention, FIGURE 4 is a cross-sectional view along the lines 4—4 of FIGURE 3, showing some of the elements in elevation and showing the sonic generator diagrammatically.

FIGURE 5 is a cross-sectional view along the lines 5—5 of FIGURE 4,

FIGURE 6 is a side elevational view, partly in cross-section, of the transducer and transducer housing showing the transducer housing in section and the transducer in elevation, and FIGURE 6A is an enlarged cross-sectional view of the pickup for the automatic frequency control system.

Figure 1:
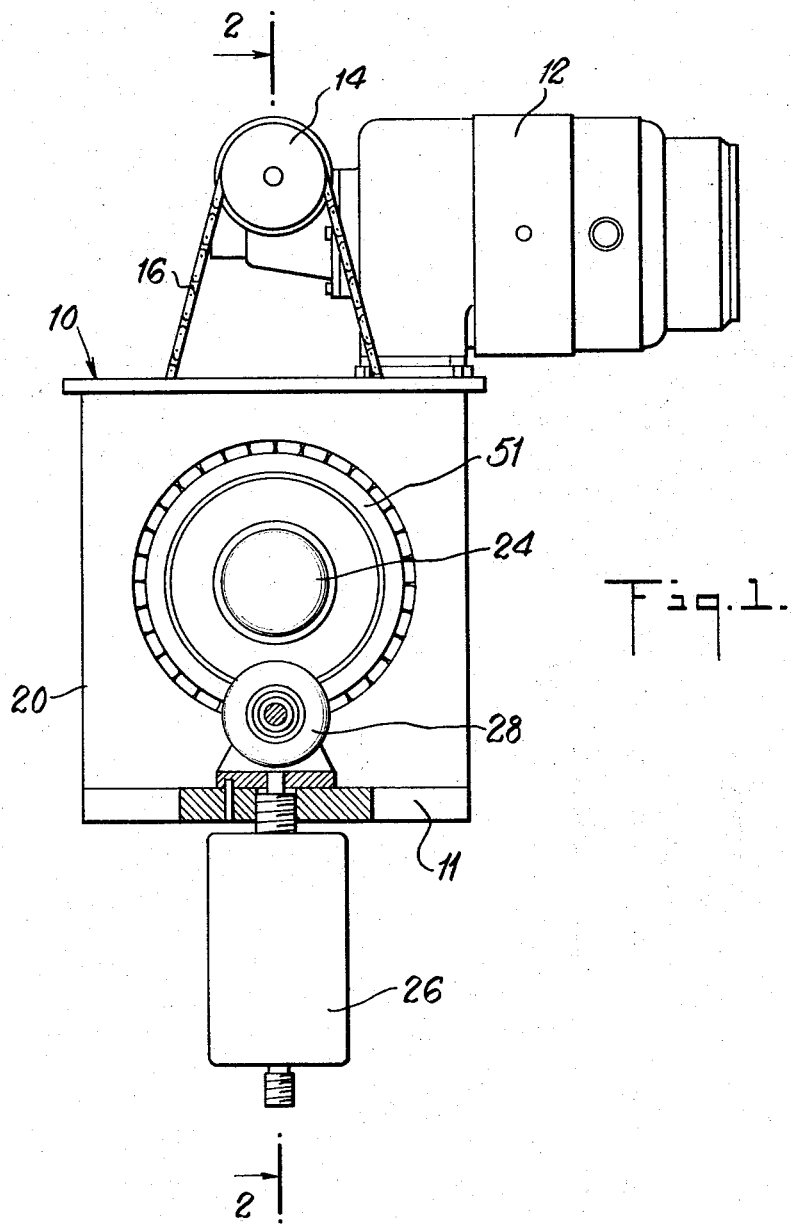
FIGURE 1 is an end elevational view of a preferred embodiment of sonic welder of my invention.
Figure 2:
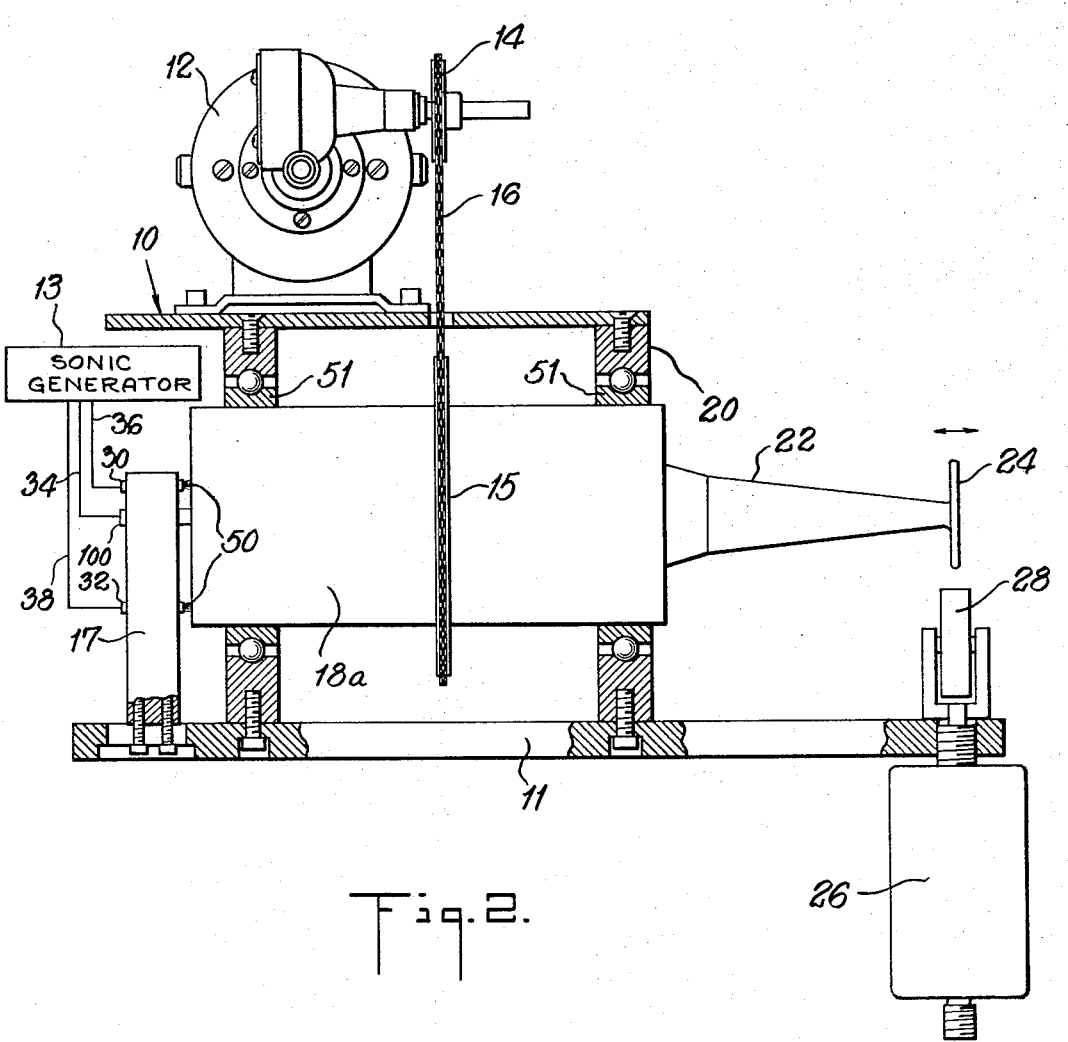
FIGURE 2 is a cross-sectional view along the lines 2—2 of FIGURE 1, showing some of the elements in elevation and showing the sonic generator diagramatically.

In the drawings, wherein, for the purpose of illustration, are shown two embodiments of rotary sonic welders of my invention, the numeral 10 generally designates a preferred embodiment of sonic welder of my invention. Welder 10 of FIGURES 1 and 2 is seen to comprise housing 20, variable-speed, reversible motor 12, drive sprocket 14, drive chain 16, transducer housing 18a (within which is mounted transducer 18), mechanical transformer 22, welding tool tip 24, pneumatic cylinder 26 and welding anvil 28. The complete assembly is mounted on plate 11. Sprocket wheel 15 is mounted on transducer housing 18a and engages chain 16 so that transducer housing 18a is rotated by motor 12. Sonic generator 13 is shown diagrammatically and is preferably a 100 watt variable gain generator with automatic frequency control. I prefer to operate welders of my invention in the frequency range 18 kc. to 20 kc. which are generally referred to as ultrasonic frequencies. However, it is also possible to use welders of my invention in the range from about 500 c.p.s. to about 1 mc. and for this reason I refer to my invention as a rotating sonic welder rather than as a rotating ultrasonic welder.

Excitation from sonic generator 13 is applied to brushes 50 through leads 36 and 38 and the automatic frequency control signal is applied to sonic generator 13 through lead 34. Brushes 50 make contact with slip rings 52 (FIGURE 6). The outer slip ring 52 is the equipment ground and the inner slip ring 52 is the high side. Assembly 30 provides a connection between high side brush 50 and lead 36 and assembly 32 provides a connection between ground brush 50 and lead 38. Assembly 100 is connected to lead 34 and is part of the automatic frequency control system. Slip rings 52 are mounted on slip ring assembly 19 and are rotated as slip ring assembly 19 rotates. Slip ring assembly 19 is contained in rotating transducer housing 18a and is a part of the rotating portion of the welder. Brushes 50, their associated assemblies 30 and 32, and assembly 100 are mounted on brush assembly 17 which is mounted on plate 11 and does not rotate.

Clamping disk 21 is provided to clamp transducer 18 in position and prevent it from separating from mechanical transformer 22 at the joining surfaces. O-ring 54 cooperates with clamping disk 21 and clamping screws 21a to clamp transducer 18 in a manner similar to that which has been described in United States Patent Number 2,947,886 of Richard D. McGunigle for Piezoelectric Ultrasonic Transducer. The surfaces of transducer 18 and mechanical transformer 22 which are in contact with each other are treated with an epoxy resin which has good acoustic transmission characteristics, which is an electrical conductor and which has been commonly used for this purpose. It can be seen that the assembly comprising transducer 18 and mechanical transformer 22 is held in fixed position with respect to housing 18a. This is accomplished by clamping the transducer-mechanical transformer assembly to mounting flange 56 which is held in fixed mechanical relationship with housing 18a by being force or friction fitted into isolating ring 58 which is affixed by adhesive or otherwise to housing 18a.

Flange 56 is provided at a nodal surface of mechanical transformer 22 and it is held in position with respect to housing 18a by means of clamping disk 21 and clamping screws 21a. Isolating ring 58 of neoprene or similar material is provided to acoustically isolate the transducer and mechanical transformer from the housing. The mechanical transformer is mechanically affixed to the housing by means of mounting flange 56. By mounting the vibrating system at the nodal surface I am able to avoid any unwanted mechanical vibrations. This is due to the fact that there is no motion of the particles of the mechanical transformer at its nodal surface.

The transducer and mechanical transformer vibrate in longitudinal mode when excitation is supplied to the transducer from sonic generator 13. Electrical connection is made to electrode 19a by means of lead 52a and to electrode 19b by means of lead 52b. Both these electrodes are applied to the end surfaces of transducer 18 so as to overlap onto the curved surface thereof in a manner well-known in the art. Electrode 19b is at equipment ground and connection is made to it through clamping plate 21, clamping screws 21a, mounting flange 56 and mechanical transformer 22; all of which are electrical conductors. If any of them are not electrical conductors, lead 52b may be run directly to electrode 19b. The vibration of transducer 18 and mechanical transformer 22 causes welding tool tip 24 to vibrate in the direction shown by the arrows of FIGURE 2. The work is placed on anvil 28 and is held in pressure contact between anvil 28 and welding tool tip 24 by means of pneumatic cylinder 26. The work is pulled or pushed between tool tip 24 and anvil 28 by any suitable means (not shown).

I have found that welds are better and more uniform when welding tool tip 24 is rotated with respect to the work. This is due to the fact that the direction of rotation of tool tip 24 is made the same as the direction of motion of the work. As a result of this procedure, the user does not work against the tool energy. The rotation of tool tip 24 is accomplished by rotating transducer housing 18a by means of chain 16 and sprocket 15 which is mounted on transducer housing 18a. Chain 16 is driven by drive sprocket 14 whose direction and velocity of rotation are controlled by motor 12. Motor 12 is made reversible and variable in speed in order to obtain the maximum operational flexibility for welding tools of my invention. Bearings 51 are provided to ensure smooth rotation of transducer housing 18a during operation.

Assemblies 100, 102 and 104 (FIGURES 6 and 6A) are used to provide the feedback signal for the automatic frequency control system. Assembly 104 comprises pickup plates 132, insulators 128 and 130, and pickup housing 124. Assembly 102 comprises contact block 120, spring 118, metallic ball 116, housing 115 and insulators 114 and 121. Assembly 100 comprises housing 106, insulators 108 and 110, and stationary contact 112. Connecting pin 122 comprises inner contact rod 123, insulator 125 and outer shell 127. Inner contact rod 123 makes electrical contact between pickup plate 132 and contact block 120. Spring 118 makes electrical contact with contact block 120 and with ball 116 which is in electrical contact with contact pin 112.

Housing 124 is insulated from pickup plate 132 by means of insulators 128 and 130. Housing 115 is insulated from contact block 120, spring 118 and ball 116 by means of insulators 114 and 121. Housing 106 is insulated from pin 112 by insulators 108 and 110. The high side circuit is made from pickup plate 132 to contact pin 112 through inner contact rod 123, contact block 120, spring 118 and ball 116. Assembly 104 is held in fixed relationship with respect to clamping plate 21 by means of mounting 126 and set-screw 129. Mounting 126 is affixed to clamping plate 21 and is provided with an opening in which assembly 104 is inserted. Set-screw 129 is tightened so that assembly 104 is held fixed in mounting 126.

As shown in FIGURE 6A, pickup plate 132 is insulated from disk 142 by means of flexible neoprene sheet 140 whereby a capacitor is formed which comprises pickup plates 132 and disk 142 which are the capacitor electrodes and neoprene sheet 140 which is the capacitor dielectric. Disk 142 is formed of brass or similar material and is mounted on insulating sheet 144 of laminated plastic or similar material. Disk 142 is placed on electrode 19a so that it is insulated from electrode 19a by insulating sheet 144. Electrical connection is made between brass disk 142 and housing 18a by means of lead 143. D.-C. voltage of the order of 300 volts is applied between the housing 18a and pickup plate 132 from a D.-C. source (not shown). As transducer 18 vibrates, disk 142 moves and the capacity of capacitor 132–140–142 changes. This change in capacity causes an alternating voltage to be generated. This alternating voltage is fed to the automatic frequency control circuit of sonic generator 13 through lead 34. A capacitor (not shown) is provided to keep the 300 volts D.-C. out of the automatic frequency control circuit.

The automatic frequency control circuit is a phase comparison system which compares the phase of the sonic generator's oscillator with that from the pickup plate. If the signals are in phase, no change is made in the oscillator frequency. If the signals are out of phase, the oscillator frequency is automatically changed until the signals are in phase. Circuit details are not shown. Reactance tube modulators or other systems may be used to compare the phases of the signals and to adjust the oscillator frequency until the signals are in phase.

I prefer to fashion the transducers used in welders of my invention of one of the ferroelectric ceramics such as those largely composed of barium titanate, lead titanate-zirconate or similar material but any transducer which will produce the required longitudinal mode vibration may be used. On contact with the work, the tool tip causes the work to be vibrated in shear mode which vibrational mode is the best for good uniform welding.

The embodiment of FIGURES 3 through 5 is very similar to that of FIGURES 1 and 2. Its transducer and transducer housing, sonic operation, and rotation of the transducer housing are the same as for the embodiment of FIGURES 1 and 2. In the embodiment of FIGURES 3 through 5, the work is held in a stationary position and the welder traverses over the work. In the particular embodiment illustrated the work (not shown) is suitably held in place around cylinder 62 so that it is in good contact with welding tool tip 24. Chain 66 is driven by motor 12 and sprocket 14a. Chain 66 is meshed in idler sprockets 67a which are mounted on bracket 67 and in idler sprockets 76b which are mounted on housing 18a. Chain 66 is held fixed at points 68 so that the rotation of motor 12 and sprocket 14a causes the complete welder assembly to move linearly along chain 66 and support 60. As sprocket 14a rotates it succesively engages the openings in chain 66 and the assembly is moved along the chain. Chain 66 does not support the assembly; it merely serves as the motion transmitting mechanism. Support 60 is mounted in bearing 61 and supports the assembly throughout its linear motion. When the assembly reaches one end of its linear travel, the direction of rotation of motor 12 and sprocket 14a is reversed and the assembly moves linearly toward the other end of support 60.

Bracket 67 is suitably affixed to the motor mounting. Axle 66a, which is driven by motor 12, carries driving sprocket wheels 14 and 14a. An opening is provided in bracket 67 through which axle 66a is inserted. The opening in bracket 67 is sufficiently large to permit free rotation of axle 66a and sprocket wheels 14 and 14a. Axles 66b are fixedly mounted on bracket 67 and idler sprocket wheels 67a are mounted so as to rotate freely on axles 66b. Idler sprocket wheels 67b are free to rotate as chain 66 moves over them and are mounted on housing 20 as shown in the figures.

I have found that when the rotation of tool tip 24 and the linear travel of the assembly are in the same direction, the welds are smoother and more uniform than they are when the direction of rotation of tool tip 24 is opposite to that of the linear travel of the assembly. Other configurations of drive mechanisms may be used to accomplish this purpose. It should be understood, however, that welding may also be done when the direction of linear travel of the assembly is opposite to that of the rotation of the tool tip.

Support 60 is held in fixed position and its length and the spacing between points 68 determine the length of linear travel of the welder assembly. The change in the direction of rotation of motor 12 also changes the direction of rotation of sprocket 14 so that the direction of rotation of tool tip 24 changes when the direction of linear travel of the assembly is reversed. Track 64 rides on roller 65 and is held in fixed position as shown in FIGURE 3. Track 64 applies pressure to roller 65 and thereby keeps the welder level. It can be seen from FIGURE 4 that if this pressure were not applied, the welder assembly would move down at the left of the figure. This would occur because there is more mass to the left of support 60 than there is to its right.

The work is mounted on cylinder 62 and as the tool is moved back and forth along the cylinder, it welds the material on the line along which it travels. This permits the user to obtain uniform, smooth welds because the linear motion is more directly related to the rotational motion of the tool.

By way of example but not by way of limitation, following are dimensions which I have found give excellent welding results:

Dimensions of transducer: 2¼″ diameter x 2.875″ long
Transducer electrodes: Silver on both ends of transducer
Transducer material: Lead titanate-zirconate
Motor type and wattage: 115 volts A.C.; 0.3 ampere; 60 cycle, single phase; 1/40 H.P.; 3000 r.p.m.
Reducer output: 40 to 1; 75 r.p.m.: 10 inch-pound torque
Dimensions of housing: 3¼″ diameter x 7″ long
Dimensions of mechanical transformer: 2¼″ diameter x 5⅝″ long; tapered to ⅜″ diameter where tool flares out
Dimensions of tool tip: 1.427″ diameter x .170″ thick
Tool material: Stainless steel
Sonic generator power and frequency: 100 watt, average; frequency—16 kc. to 22 kc.
Type and dimensions of material welded: .00017″ to .008″ aluminum, .002″ copper, .001″ stainless steel, and plastics and other materials of similar dimensions.

While I have disclosed my invention in relation to specific examples and in specific embodiments, I do not wish to be limited thereto, for obvious modifications will occur to those skilled in the art without departing from the spirit and scope of my invention.

Having thus described my invention, I claim:

A rotating sonic welder comprising a linear support, an outer housing mounted for movement along the linear support, an inner housing rotatably mounted within said outer housing, a transducer mounted within said inner housing and fixed in position with respect thereto, a mechanical transformer affixed at one end to the transducer, a disk-shaped tool tip affixed to the outer end of said mechanical transformer, a sonic generator, means connecting said sonic generator to said transducer for vibrating said transducer, said mechanical transformer and said disk-shaped tool tip in longitudinal mode transversely to the linear support, means for supporting the material to be welded substantially parallel to the linear support and holding the same in contact with the edge of said disk-shaped tool tip so as to be welded by the transverse vibrations of said disk-shaped tool tip, an electric motor carried by the outer housing, a chain and sprocket connection between the electric motor and the inner housing for rotating the same whereby said transducer, said mechanical transformer and said disk-shaped tool tip are rotated to present progressively the edge of the disk-shaped tool tip to the material being welded, a chain substantially parallel to the linear support and stationarily anchored at its ends, and a sprocket operated by the electric motor and engaging the chain for moving the outer housing along the linear support for continuously welding the material along its length.

References Cited by the Examiner

UNITED STATES PATENTS

| | | | |
|---|---|---|---|
| 375,836 | 1/1888 | Rowland | 78—90 |
| 391,441 | 10/1888 | Warner | 78—90 |
| 1,221,368 | 4/1917 | Olsen | 259—146 |
| 1,921,501 | 8/1933 | Bower | 331—155 |
| 1,990,554 | 2/1935 | Libberton | 259—146 |
| 2,302,895 | 11/1942 | Root | 331—156 |
| 2,457,310 | 12/1948 | Judelshon | 51—247 |
| 2,804,725 | 9/1957 | Dench | 51—59 |
| 2,946,120 | 7/1960 | Jones | 29—470 |
| 2,947,886 | 8/1960 | McGunigle | 310—8.3 |
| 3,017,792 | 1/1962 | Elmore | 78—82 |
| 3,217,957 | 11/1965 | Jarvie | 228—1 |

CHARLES W. LANHAM, *Primary Examiner.*

THOMAS E. BEALL, WILLIAM W. DYER, JR.,
*Examiners.*

G. P. CROSBY, *Assistant Examiner.*